US012682810B2

(12) United States Patent
Kornienko et al.

(10) Patent No.: US 12,682,810 B2
(45) Date of Patent: Jul. 14, 2026

(54) MULTI-PHASE LINEAR DITHERING SYSTEMS AND METHODS

(71) Applicant: Apple Inc., Cupertino, CA (US)

(72) Inventors: Alexey Kornienko, Watford (GB); Mahesh B Chappalli, San Jose, CA (US); Pradeep Nagesh, Irvine, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 18/615,999

(22) Filed: Mar. 25, 2024

(65) Prior Publication Data

US 2025/0299611 A1 Sep. 25, 2025

(51) Int. Cl.
*G09G 3/20* (2006.01)

(52) U.S. Cl.
CPC ....... *G09G 3/2044* (2013.01); *G09G 2320/02* (2013.01)

(58) Field of Classification Search
CPC ......................... G09G 3/2044; G09G 2320/02
USPC ........ 345/102, 204, 589, 596–598; 382/268; 348/E7.003
See application file for complete search history.

(56) References Cited

U.S. PATENT DOCUMENTS

| | | | | |
|---|---|---|---|---|
| 9,552,654 | B2 | 1/2017 | Barnhoefer | |
| 10,055,809 | B2 | 8/2018 | Holland et al. | |
| 10,593,252 | B1 * | 3/2020 | Chappalli | G09G 3/2055 |
| 11,183,155 | B2 | 11/2021 | Zhang et al. | |
| 2005/0152614 | A1 * | 7/2005 | Daly | H04N 19/126 382/268 |
| 2006/0197768 | A1 * | 9/2006 | Van Hook | G09G 5/363 345/546 |
| 2009/0060360 | A1 | 3/2009 | Huang et al. | |
| 2011/0025591 | A1 * | 2/2011 | Han | G09G 3/3406 345/102 |
| 2012/0229497 | A1 * | 9/2012 | Tripathi | G09G 3/2037 345/596 |
| 2012/0262475 | A1 * | 10/2012 | Frank | H04N 1/40075 345/597 |
| 2013/0194494 | A1 * | 8/2013 | Chun | G09G 3/2003 348/E7.003 |

(Continued)

FOREIGN PATENT DOCUMENTS

| | | | |
|---|---|---|---|
| CN | 102831870 | B | 5/2015 |
| CN | 104779263 | A | 7/2015 |

(Continued)

*Primary Examiner* — Prabodh M Dharia
(74) *Attorney, Agent, or Firm* — FLETCHER YODER PC

(57) ABSTRACT

An electronic device may include an electronic display and image processing circuitry. The image processing circuitry may receive input image data in a non-linear color space at a bit-depth, truncate one or more least-significant-digits of the input image data, generating truncated image data, and determine an alpha value indicative of how many pixel locations, of a block of pixels, to which an increase in gray level is to be applied based on an input pixel value, corresponding to a pixel of interest within the block of pixels. Additionally, the alpha value may correspond to a ratio of gray levels in a linear color space that equates to a luminance level of the input pixel value at the bit-depth. The increase in the gray level may be applied to pixel values of the truncated image data corresponding to the pixel locations to generate dithered image data.

21 Claims, 9 Drawing Sheets

(56) References Cited

U.S. PATENT DOCUMENTS

| | | | | |
|---|---|---|---|---|
| 2018/0007374 | A1* | 1/2018 | Atkins | H04N 19/85 |
| 2018/0114505 | A1 | 4/2018 | Heywood-Lonsdale et al. | |
| 2020/0007151 | A1* | 1/2020 | Fenney | H04N 19/182 |
| 2023/0087480 | A1* | 3/2023 | Ryu | H03M 1/1019<br>345/204 |
| 2023/0115938 | A1 | 4/2023 | Yeh et al. | |
| 2024/0202892 | A1* | 6/2024 | Huang | G06T 5/92 |

FOREIGN PATENT DOCUMENTS

| | | | |
|---|---|---|---|
| CN | 113132703 | A | 7/2021 |
| CN | 111435990 | B | 9/2022 |

* cited by examiner

| PHASE (P) | PHASE INDEX | X-BIT ($X_p$) | Y-BIT ($Y_p$) |
|---|---|---|---|
| A | 0 | 0 | 0 |
| B | 2 | 1 | 0 |
| C | 1 | 0 | 1 |
| D | 3 | 1 | 1 |
| E | 3 | 1 | 1 |
| F | 3 | 1 | 1 |

94 96 98

MULTI-PHASE LINEAR DITHERING SYSTEMS AND METHODS

BACKGROUND

The present disclosure generally relates to dithering of image data for display on an electronic display and, more particularly, to utilizing a multi-phased distribution of dithered bits for increased accuracy.

In general, electronic devices display information by providing image data indicative of brightness values for individual pixels to an electronic display. Moreover, the image data may provide brightness levels (e.g., gray levels) for each color component of the pixels to achieve different colors. However, in some scenarios, image data may be formatted at a higher bit-depth than the electronic display has brightness levels to output. For example, a pixel value may have 10-bits, allowing for 1024 different possible gray levels, while the electronic display may operate at 8-bits, being able to output just 256 different gray levels.

Dithering may be utilized to reduce the bit-depth of the image data to that of the electronic display or other desired bit-depth. In general, dithering reduces the bit-depth of the image data by removing the least significant bits (LSBs) of the original image data and increasing the gray level value, at the new (lower) bit-depth, of a portion of the pixel values to account for the removed LSBs. In other words, the removed LSBs may be considered fractions of the gray level of the electronic display, and a portion of the pixel values, corresponding to the fractional gray level, may be increased or decreased by an integer gray level such that the average pixel value, spatially and/or temporally, is approximately equal to the original image data value. This is because the human eye will integrate the amount of light emitted by the pixels over space and time. As a simplified example, a display pixel may be dithered to appear to emit a gray level of 18.5 by emitting at a gray level 18 for one image frame, then emitting at a gray level 19 for another image frame, and so on. The human eye may integrate the light from the display pixel in this example so that the display pixel would seem to be at a gray level of 18.5.

Furthermore, in some scenarios, image data may be processed in a non-linear color space (e.g., domain), such as a gamma color space. However, the amount of luminance output between gray levels in a non-linear color space may vary. In other words, the amount of luminance that corresponds to a gray level between two surrounding gray levels in the non-linear color space may not correspond to the average of the two surrounding gray levels. As such, as presently recognized, traditional dithering methods may introduce error that leads to luminance outputs that deviate from the desired luminance level.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In general, image data may be dithered spatially, temporally, or spatiotemporally to distribute an increase or decrease in image data values (e.g., gray level value) to, in a spatial and/or temporal average, provide an effective increase in bit-depth. Indeed, dithering may be performed to reduce the bit-depth of image data for a number of reasons such as reducing computational complexity, reducing bandwidth (e.g., memory and/or processor) usage, and/or to match the bit-depth capabilities of an electronic display.

However, traditional dithering operations may lead to image artifacts due to error in luminances between linear and non-linear color spaces (e.g., image data formats, domains) and/or due to how the dithered bits are distributed amongst the pixels. As such, embodiments of the present disclosure may include a dither block of image processing circuitry for performing a multi-phase dither operation that accounts for the non-linearity of the non-linear color space while dithering in the non-linear color space and evenly and randomly distributing dithered bits amongst a block of pixels for more accurate and more efficient dithering of the image data.

In some embodiments, the dither block (e.g., dither circuitry) may include a linearity sub-block to determine how many pixels (discussed herein as an alpha value) of an N×N block of pixels surrounding a pixel of interest are to receive a gray level increase while taking into account the non-linearity of the non-linear color space. For example, the linearity sub-block may utilize an algorithm, look-up-table (LUT), or other construct to determine the alpha value from the input pixel value of the pixel of interest. Additionally, the dither block may include a multi-phase ranking sub-block to determine the distribution of the gray level increases amongst the block of pixels and a dithering sub-block to apply the gray level increases to the input image data based on the alpha value and the determined distribution.

To achieve an evenly distributed random assignment of the gray level increases, the multi-phase ranking sub-block may break down the block of pixels into sub-blocks until a 1×1 sub-block is achieved, assigning a phase set at each decomposition. The phase sets may be a randomized ordering of indexing numbers (e.g., {0,1,2,3}, {2,3,1,0}, {2,0,1, 3}, etc.) corresponding to the sub-blocks of a decomposition, and a ranking may be calculated for each pixel of the block of pixels based on the phase sets. For example, each pixel of the block of pixels may include a unique set of phase indexes based on the phase sets, which are used to calculate unique rankings for each pixel of the block of pixels. In some embodiments, the rankings are discrete and range from 0 to $N^2-1$. The rankings may be compared with the alpha value (e.g., number of pixels to receive an increase in the gray level), and each pixel location of the block of pixels with a ranking greater than or equal to the alpha value may receive a gray level increase. As such, the dither block may provide a linear dither to image data in a non-linear color space while evenly and randomly distributing gray level increases to a block of pixels for smoother and more efficient dithering with reduced error and reduced image artifacts.

BRIEF DESCRIPTION OF THE DRAWINGS

Various aspects of this disclosure may be better understood upon reading the following detailed description and upon reference to the drawings described below.

DETAILED DESCRIPTION

Figure 1:
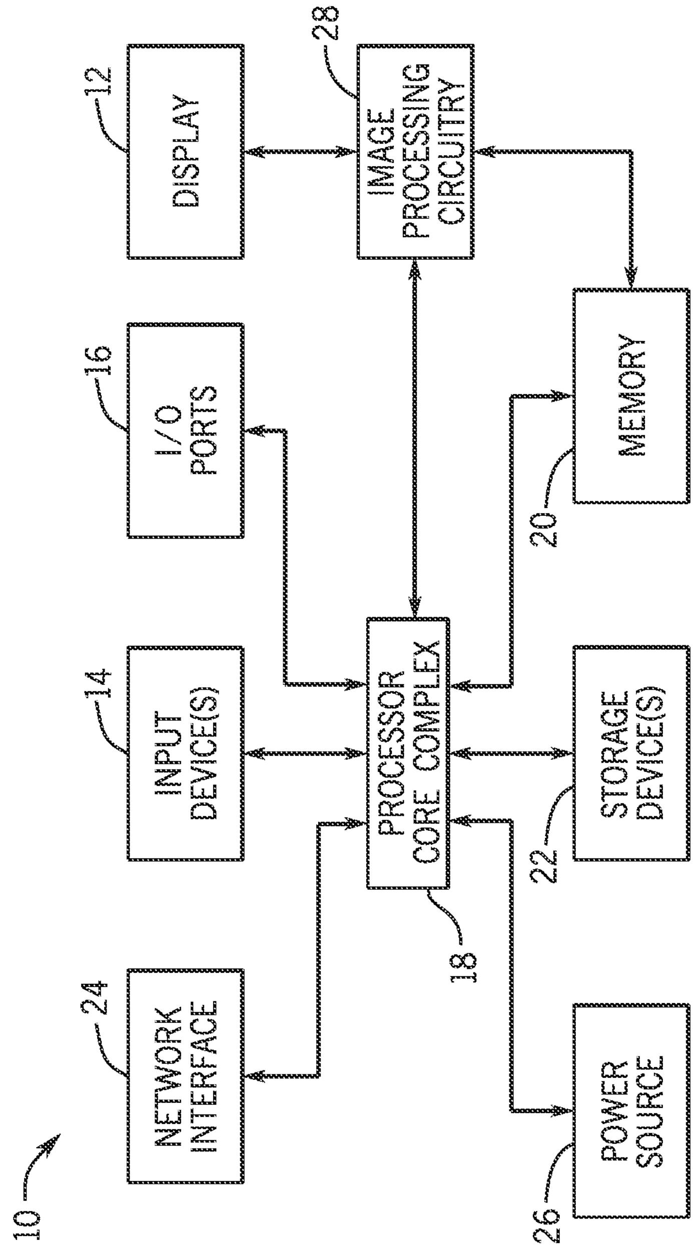
FIG. 1 is a schematic block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "of" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution (e.g., bit-depth).

In some embodiments, the display pixels may include self-emissive pixels such as light emitting diodes (LEDs), organic LEDs (OLEDs), etc. or utilize transmissivity regulating elements such as liquid crystal pixels. In general, self-emissive pixels generate light indicative of a target luminance level according to the image data associated with the corresponding pixel. Alternatively, transmissive displays (e.g., liquid crystal displays (LCDs) utilize one or more backlights to generate light and regulate the amount and/or color of the generated light via transmissivity regulating elements according to the image data.

An image data source may provide the image data as a stream of pixel data, in which data for each pixel indicates a target luminance (e.g., brightness and/or color) of one or more display pixels located at corresponding pixel positions. In some embodiments, image data may indicate target luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale, or other color basis. Furthermore, as disclosed herein, image data may be processed in a linear or non-linear color space (e.g., gamma-corrected color space) and may be of any suitable bit-depth.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer. Moreover, the image data may be altered to enhance perceived contrast, sharpness, resolution, etc. For example, in some embodiments, image data may be dithered spatially, temporally, or spatiotemporally. In general, dithering allows for a spatial and/or temporal distribution of an increase or decrease in image data values (e.g., gray level value) to provide an effective increase in bit-depth in the spatial, temporal, or spatiotemporal average. The effective increase in bit-depth may be utilized to decrease the actual bit-depth of the image data while maintaining a visual gamut that approximates that of the higher (e.g., original) bit-depth.

As should be appreciated, dithering may be performed to reduce the bit-depth of the image data for a number of reasons such as reducing computational complexity, reducing bandwidth (e.g., memory and/or processor) usage, and/or to match the bit-depth capabilities of an electronic display. Indeed, the luminance output of a display pixel is based on a voltage, supplied to the pixel circuitry, corresponding to a gray level of the image data. Moreover, an electronic display may be designed to provide a set number of discrete voltages and/or discrete duty cycles according to the bit-depth capabilities of the electronic display. For example, an electronic display designed for image data at 8-bits per color component may provide 256 different luminance levels (e.g., gray levels 0-255) per color component. Furthermore, performing image processing at higher bit-depths may provide increased image quality, and dithering may be performed to reduce the bit-depth to that of the electronic display while maintaining image quality.

However, traditional dithering operations may introduce error that leads to luminance outputs that deviate from the desired luminance level. For example, the removed (e.g., truncated) bits may be considered fractions of a gray level, and a portion (e.g., corresponding to the fractional gray level) of the pixel values surrounding a pixel of interest (in space and/or time) may be increased by a gray level such that the average pixel value, spatially and/or temporally, is approximately equal to the original image data value. However, the image data may be in a non-linear color space (e.g., non-linear domain), and the amount of luminance that corresponds to a gray level between two surrounding gray levels in the non-linear color space may not correspond to the average of the two surrounding gray levels, leading to error. Such error may be particularly pronounced at low gray levels (e.g., less than gray level 12/256, less than gray level 8/254, less than gray level 4/256, and so on, as well as corresponding gray levels in other bit-depths) in gamma-corrected color space, such as Gamma 2.2, Gamma 2.4, and BT 1886 to name a few.

In some scenarios, the image data may be converted from a non-linear color space to a linear color space, a dither operation may be performed in the linear color space, and the image data may be converted back to the non-linear color space. However, such conversions may be costly in processing bandwidth, memory, and/or time and may introduce additional errors associated therewith. As such, embodiments of the present disclosure may include a dither block of image processing circuitry for performing a multi-phase dither operation that accounts for the non-linearity of the non-linear color space while dithering in the non-linear color space and evenly and randomly distributing dithered bits amongst a block of pixels for more accurate and more efficient dithering of the image data. Moreover, in some embodiments, the dither block may not convert the image data to the linear color space during the multi-phase dither operation.

As discussed herein, dithering may distribute dithered bits to pixel locations of a block of pixels surrounding a pixel of interest. For example, an N×N block of pixels, including the pixel of interest, may be set such that a number of pixels of the N×N block of pixels are increased by one gray level to account for the dithered bits when the bit-depth is reduced. As should be appreciated, the block of pixels may be of any suitable size (e.g., 2×2, 4×4, 8×8, 16×16, 32×32, 64×64, and so on) depending on implementation. For example, the size of the block of pixels may depend on a pixel density (e.g., pixels per square inch) of the electronic display, an estimated distance from the electronic display to a viewer's eye, the number of bits being dithered (e.g., bit-depth reduction), and/or additional parameters. As should be appreciated, while discussed herein as utilizing block sizes as multiples of two, other sized square blocks (e.g., 3×3, 5×5, 6×6, etc.) may also be utilized with the present techniques.

In some embodiments, the dither block (e.g., dither circuitry) may include a linearity sub-block to determine how many pixels (discussed herein as an alpha value) of the block of pixels are to receive a gray level increase while taking into account the non-linearity of the non-linear color space. Additionally, the dither block may include a multi-phase ranking sub-block to determine the distribution of the gray level increases amongst the block of pixels and a dithering sub-block to apply the gray level increases to the input image data based on the alpha value and the determined distribution.

While accounting for the non-linearity of the non-linear color space of the image data provides a reduced error, in the aggregate, distributing the gray level increases in a relatively even manner amongst the block of pixels may help smooth optical averaging of the human eye and further reduce the likelihood of image artifacts being introduced by the dithering process. Moreover, in some embodiments, the multi-phase dither may also include an aspect of randomness to the distribution to obfuscate patterns, such as banding, or other image artifacts. To achieve the evenly distributed random assignment of the gray level increases, the multi-phase ranking sub-block may break down the block of pixels into sub-blocks until a 1×1 sub-block is achieved, assigning a phase set at each decomposition. The phase sets may be a randomized ordering of numbers (e.g., {0,1,2,3}, {2,3,1,0}, {2,0,1,3}, etc.) corresponding to the sub-blocks of a decomposition, and a ranking may be calculated for each pixel of the block of pixels based on the phase sets. For example, each pixel of the block of pixels may include a unique set of phase indexes based on the phase sets, which are used to calculate unique rankings for each pixel of the block of pixels. In some embodiments, the rankings are discrete and range from 0 to $N^2-1$.

The rankings may be compared with the alpha value (e.g., number of pixels to receive an increase in the gray level), and each pixel of the block of pixels with a ranking greater than or equal to the alpha value may receive a gray level increase. As such, the dither block may provide a linear dither to image data in a non-linear color space while evenly and randomly distributing gray level increases to a block of pixels for smoother and more efficient dithering with reduced error and image artifacts. For example, an 8×8 block of pixels may be decomposed into four 4×4 sub-blocks, where each 4×4 sub-block may be decomposed into four 2×2 sub-blocks, and each 2×2 sub-block may be decomposed into four 1×1 sub-blocks. Moreover, each decomposed set of four sub-blocks may be associated with a phase set of four numbers (e.g., zero through three) that correspond with the four sub-blocks. The numbering of the phase sets (e.g., which sub-block corresponds to which phase number) may be randomized.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
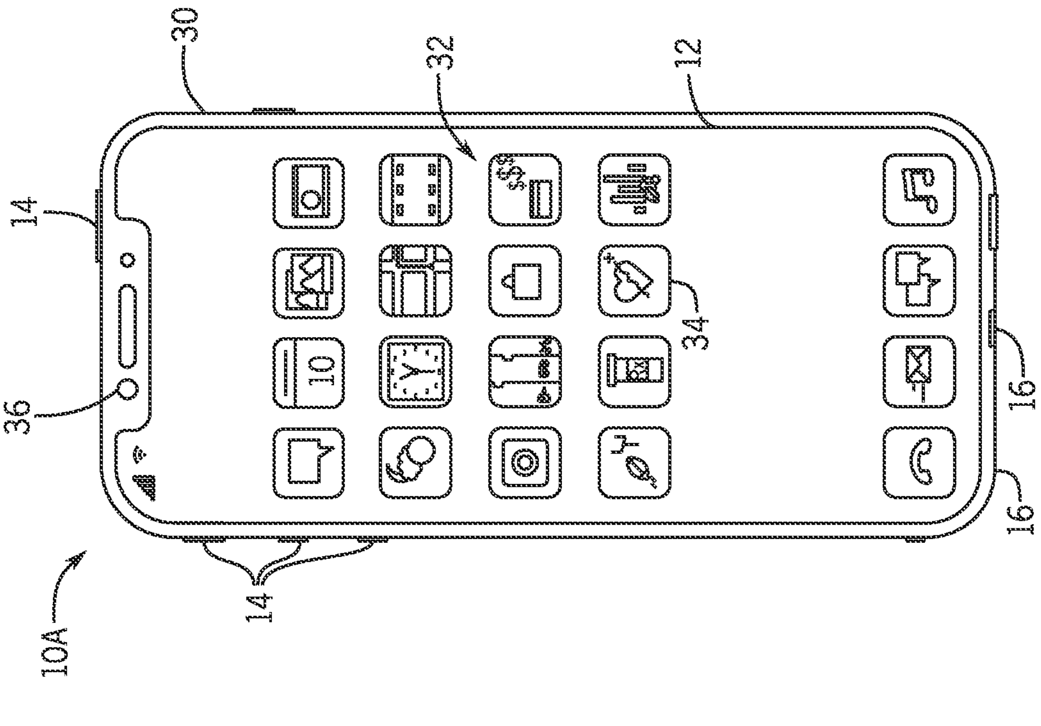
FIG. 2 is a front view of a mobile phone representing an example of the electronic device of FIG. 1, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
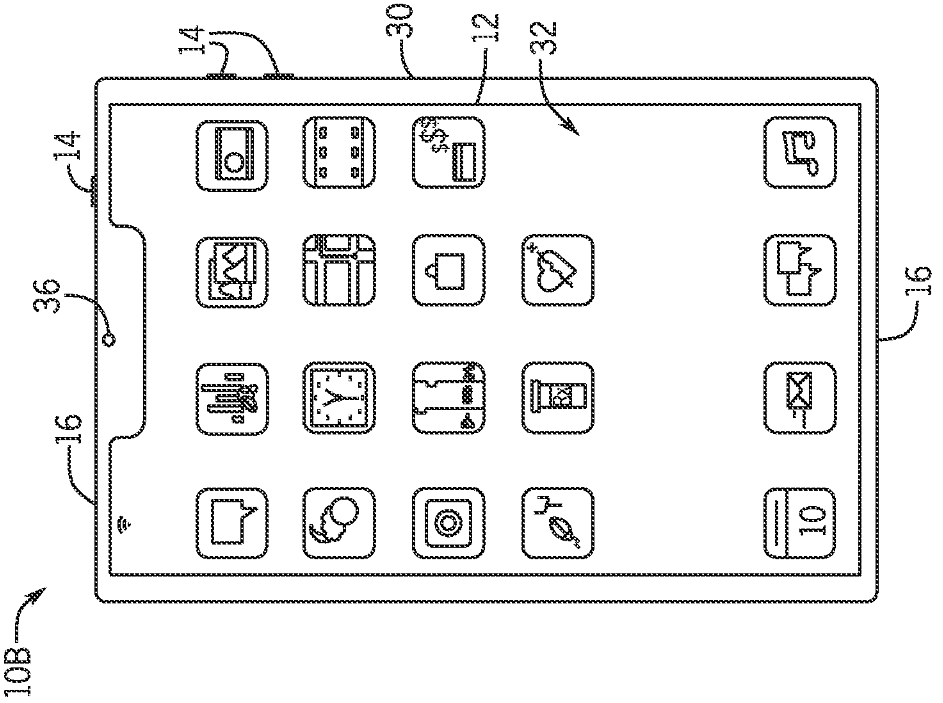
FIG. 3 is a front view of a tablet device representing an example of the electronic device of FIG. 1, in accordance with an embodiment.
Figure 4:
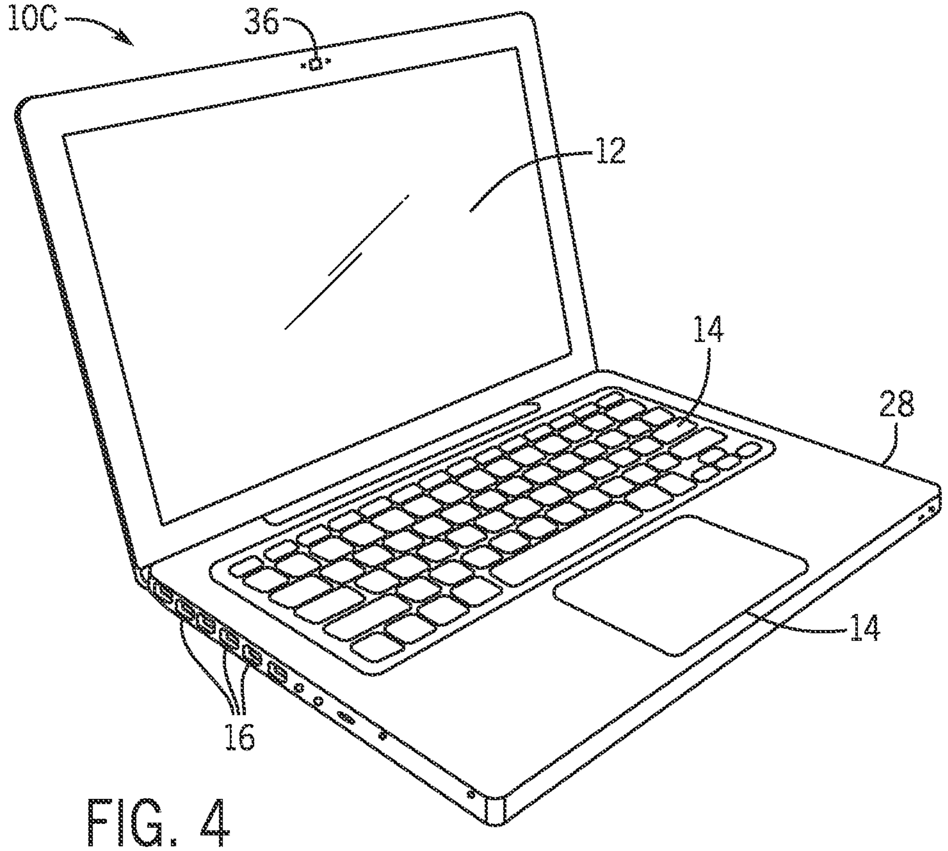
FIG. 4 is a front view of a notebook computer representing an example of the electronic device of FIG. 1, in accordance with an embodiment.
Figure 5:
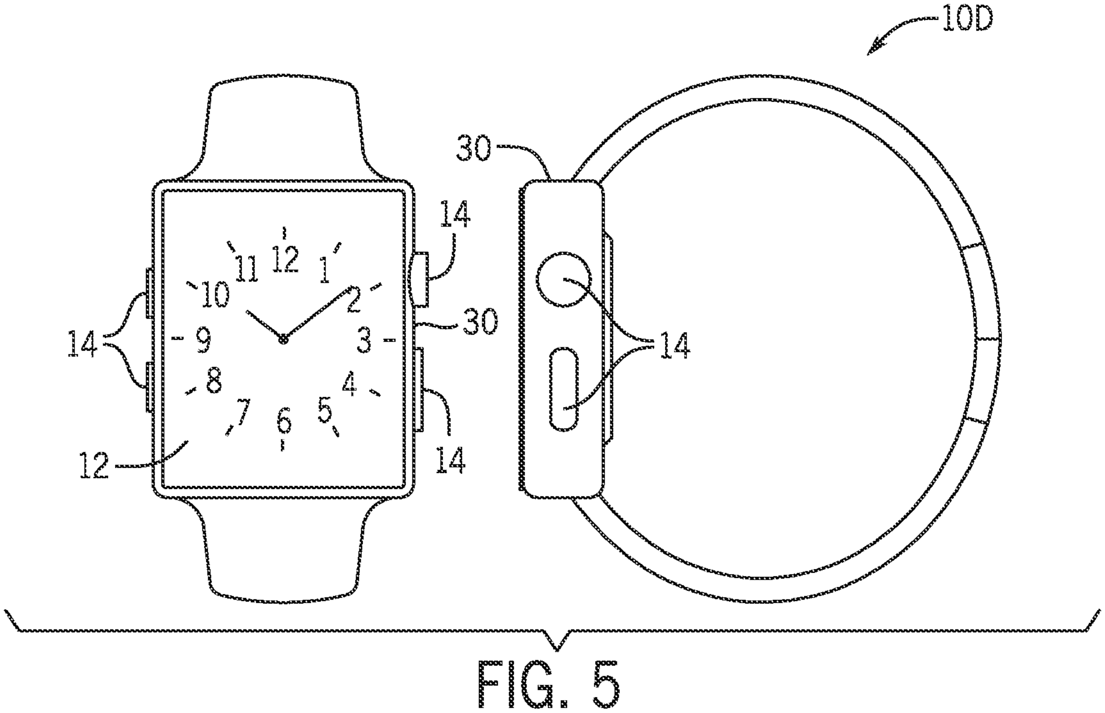
FIG. 5 is a front and side view of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
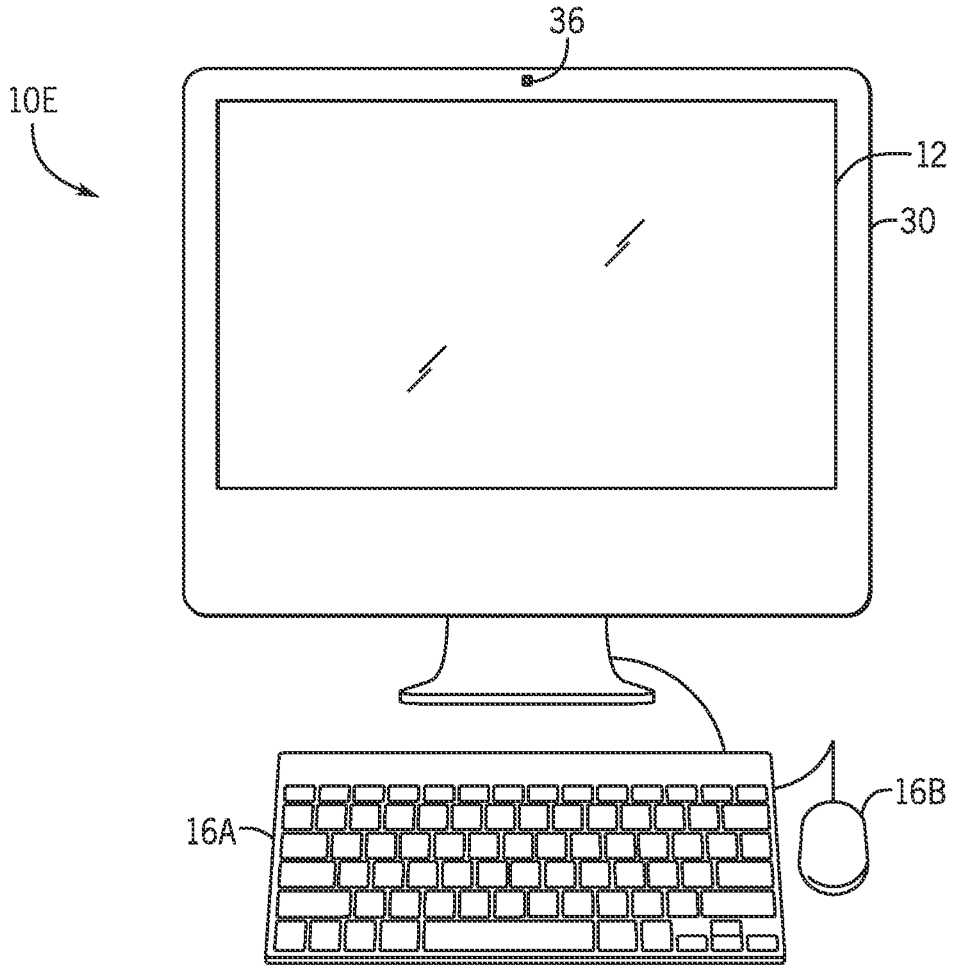
FIG. 6 is a front view of a computer representing an example of the electronic device of FIG. 1, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
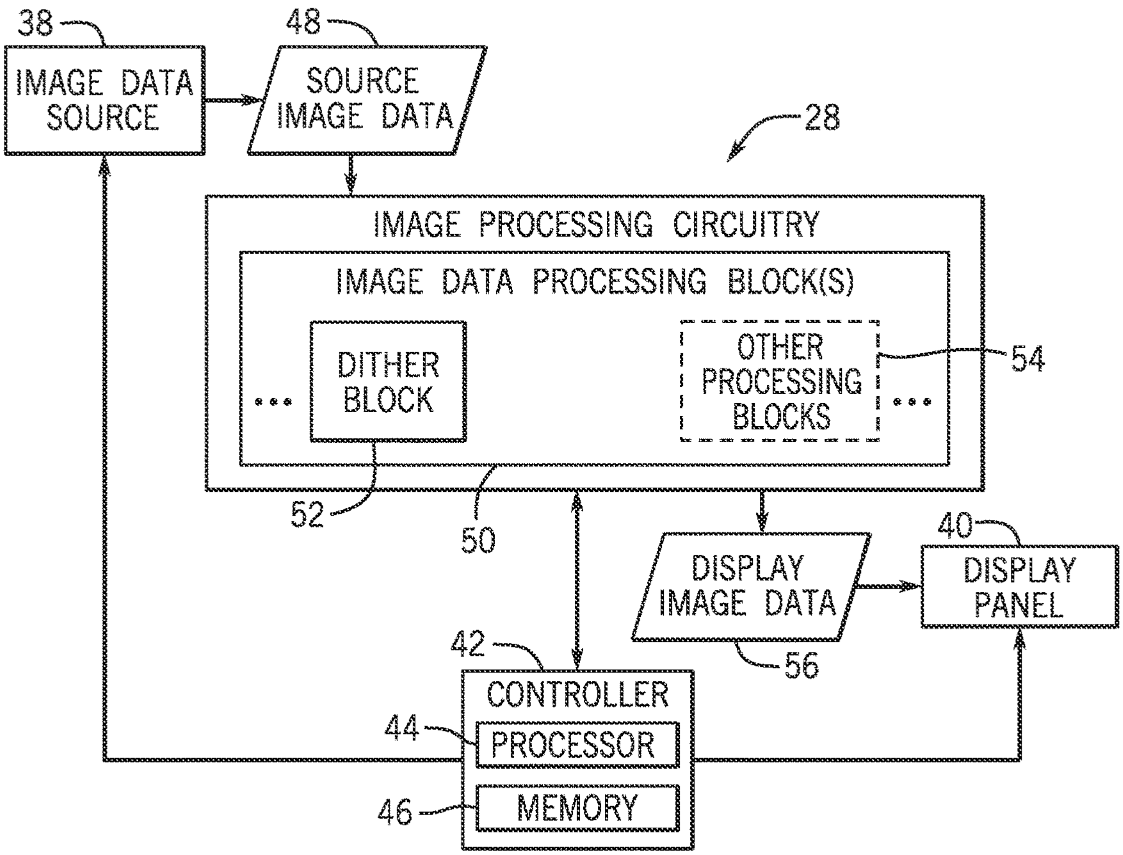
FIG. 7 is a block diagram of a portion of the image processing circuitry of FIG. 1 including a dither block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include general purpose and/or dedicated hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a self-emissive technology display, a reflective technology display, a transmissive technology display, or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a dither block 52. As should be appreciated, multiple other processing blocks 54 may also be incorporated into the image processing circuitry 28, such as a color management block, a pixel contrast control (PCC) block, a burn-in compensation (BIC) block, a scaling/rotation block, etc. before and/or after the dither block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

As described herein, the dither block 52 may adjust image data (e.g., by color component and/or grey level), for example, to facilitate compensating for quantization error due to a reduction in bit-depth. For example, an electronic display 12 may not be able to produce the full color pallet of the source image data 48 and/or an intermediate bit-depth may be desired for processing within the image processing circuitry 28. Instead of merely rounding or estimating to the nearest gray level, the dither block 52 may introduce spatial noise to intertwine gray levels of the electronic display 12 at localized display pixels to approximate the original image data (e.g., prior to dithering), thereby providing a more aesthetic, clear, and/or sharp image for viewing at the reduced bit-depth. Additionally or alternatively, the dither block 52 may also provide temporal and/or spatiotemporal dithering which may change and/or alternate gray levels in successive images such that, in the temporal average, the perceived bit-depth is greater than the actual bit-depth after the dither block 52.

Figure 8:
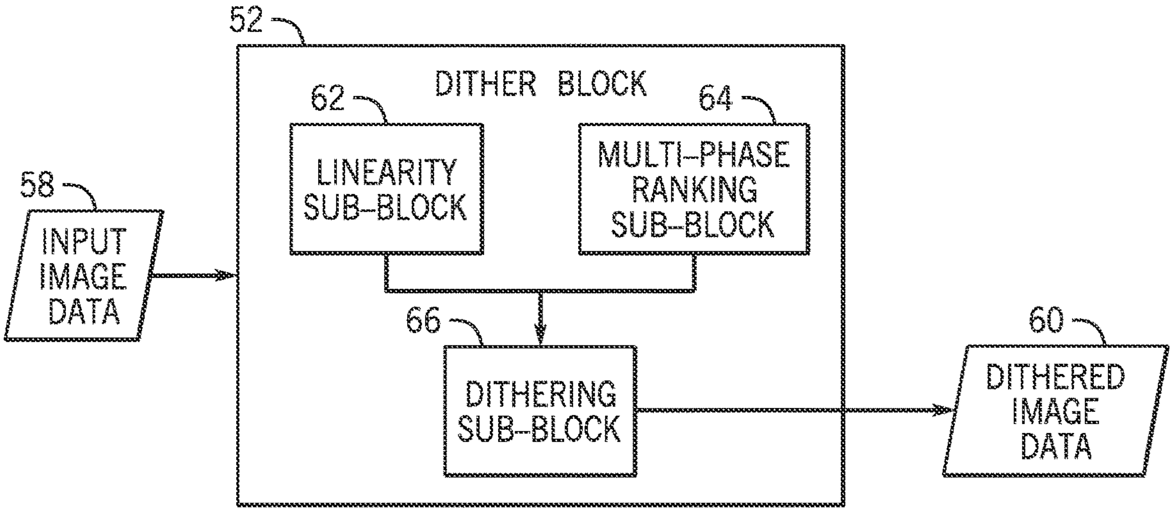
FIG. 8 is a block diagram of the dither block of FIG. 7, in accordance with an embodiment.

In general, the dither block 52 (e.g., dither circuitry) may receive input image data 58 (e.g., the source image data 48 or image data from an other processing block 54) and output dithered image data 60, as shown in FIG. 8. As should be appreciated, the input image data 58 may be dithered to reduce the bit-depth of the input image data 58 by any desired amount (e.g., 1-bit, 2-bit, 3-bit, 4-bit, and so on). In some embodiments, the dither block 52 may include a linearity sub-block 62 (e.g., linearity circuitry), a multi-phase ranking sub-block 64 (e.g., multi-phase ranking circuitry), and a dithering sub-block 66 (e.g., dithering circuitry). In some embodiments, the linearity sub-block may determine how many pixels of an N×N block of pixels surrounding a pixel of interest are to receive a gray level increase. Additionally, the multi-phase ranking sub-block 64 may determine the distribution of the gray level increases amongst the block of pixels and the dithering sub-block 66 may apply the gray level increases to the input image data 58 based on the alpha value and the distribution from the linearity sub-block 62 and the multi-phase ranking sub-block 64, respectively.

As discussed herein, the input image data 58 may be in one of multiple different formats including linear or non-linear color spaces. Indeed, in some embodiments, the input image data 58 may be in a non-linear color space such as a gamma-corrected color space for displaying luminance levels according to how a human eye perceives them. However, non-linear color spaces exhibit non-linear changes in luminance from one gray level to the next. In other words, the amount of luminance that corresponds to a gray level between two surrounding gray levels in the non-linear color space may not correspond to the average of the two surrounding gray levels, which may lead to error in traditional dithering techniques. Such error may be particularly pronounced at low gray levels (e.g., less than gray level 12/256, less than gray level 8/254, less than gray level 4/256, and so on, as well as corresponding gray levels in other bit-depths) in gamma-corrected color spaces (e.g., Gamma 2.2, Gamma 2.4, and BT 1886) that have smaller changes in luminance per gray level at lower gray levels.

Figure 9:
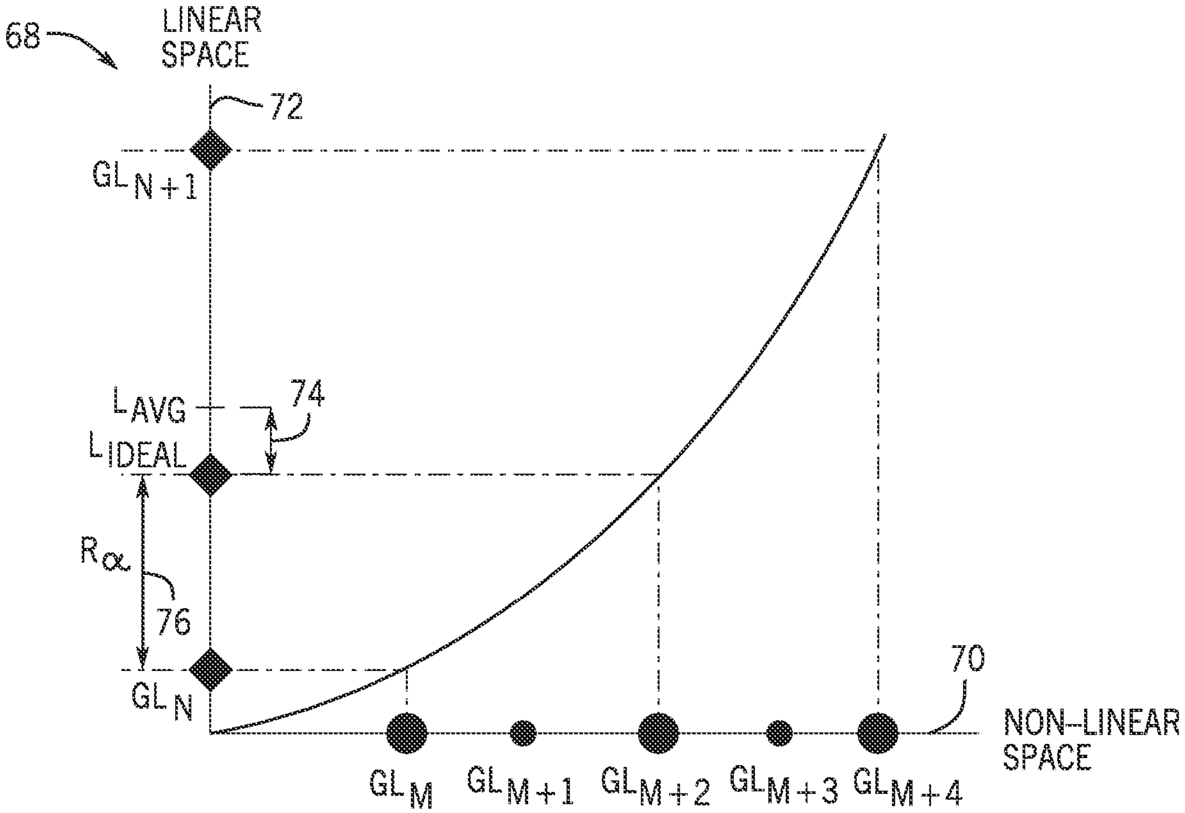
FIG. 9 is a graph of a relationship between a non-linear color space at an input bit-depth and a linear color space at a reduced bit-depth, in accordance with an embodiment.

To help illustrate, FIG. 9 is a graph 68 of a relationship between a non-linear color space 70 at an input bit-depth on the x-axis and a linear color space 72 at a reduced bit-depth on the y-axis. In the example of FIG. 9, the non-linear color space 70 has a bit-depth that is two bits greater than that of the linear color space 72, with gray level m, $GL_m$, of the non-linear color space 70 corresponding to gray level n, $GL_n$, of the linear color space 72 and gray level m+4, $GL_{m+4}$, of the non-linear color space 70 corresponding to gray level n+1, $GL_{n+1}$, in the linear color space 72. Due to the non-linearity, gray levels in the non-linear color space 70 (e.g., $GL_{m+1}$, $GL_{m+2}$, $GL_{m+3}$) that do not have corresponding discrete gray levels in the linear color space 72 at the reduced bit-depth may not have the desired luminance level if simply averaged. For example, while $GL_{m+2}$ is halfway between $GL_m$ and $GL_{m+4}$ in the non-linear color space 70, the ideal luminance, $L_{ideal}$, corresponding to the non-linear relationship deviates from the halfway point (e.g., average) between $GL_n$ and $GL_{n+1}$ in the linear color space 72 by an error 74.

Figure 10:
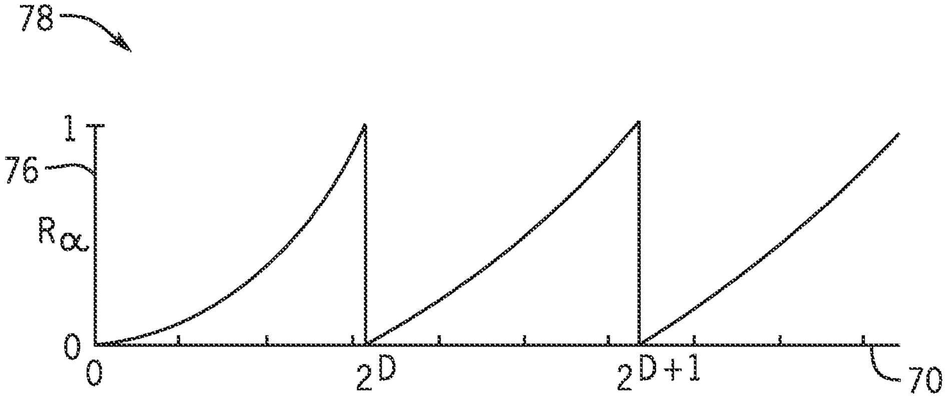
FIG. 10 is a graph of example alpha ratios versus input gray levels in the non-linear color space, in accordance with an embodiment.

As such, in some embodiments, an alpha ratio 76, Ra, may be determined that corresponds to the fractional gray level in the linear color space 72 at the reduced bit depth that aligns with the desired luminance level (e.g., $L_{ideal}$). In other words, the alpha ratio 76 is a measure of where the desired luminance level is between the two nearest discrete gray levels of the linear color space 72 at the reduced bit-depth. In some embodiments, the linearity sub-block 62 may utilize an algorithm, look-up-table (LUT), or other construct to determine the alpha ratio 76 based on the input gray level (e.g., $GL_{m+2}$) in the non-linear color space 70. To help illustrate, FIG. 10 is a graph 78 of example alpha ratios 76 versus input gray levels in the non-linear color space 70. As should be appreciated, the alpha ratio 76 remains less than one and restarts at zero periodically, depending on the number of bits being dithered, d. For example, if six bits are being dithered, the alpha ratio 76 may return to zero every $2^6$ (e.g., $2^d$) gray levels of the non-linear color space 70. As such, in some embodiments, the alpha ratio 76 (and therefore alpha value) may vary based on the input pixel value of the input image data 58 and the number of bits to be dithered.

Figure 11:
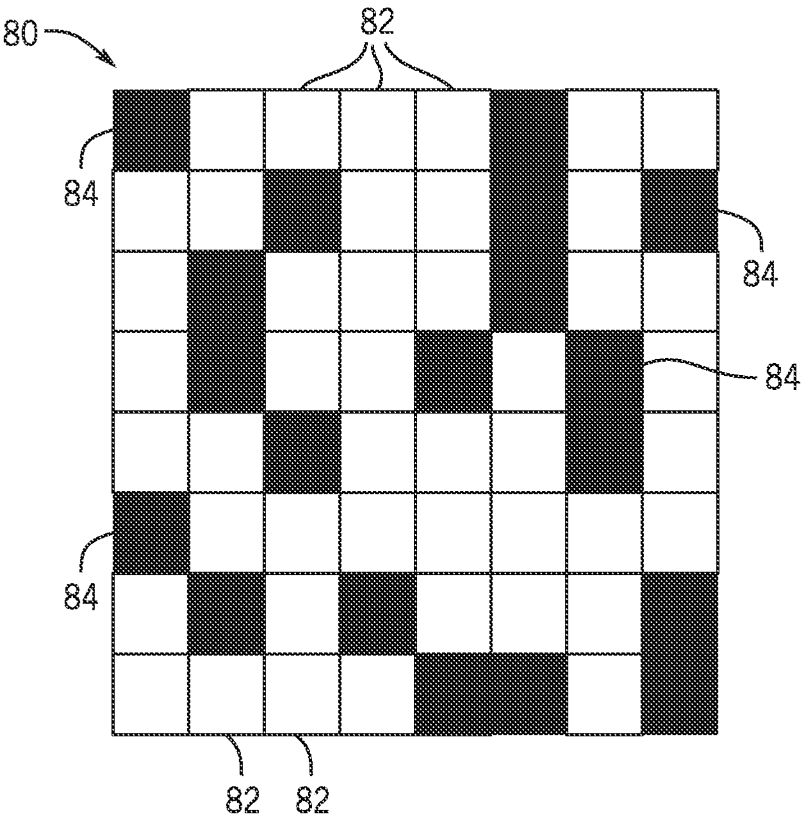
FIG. 11 is an example block of pixels with base pixel values and dithered pixel values, in accordance with an embodiment.

To distribute the dither to the pixel values of the input image data 58, a block of pixels 80 including a pixel of interest (e.g., corresponding to the pixel value being dithered), as shown in FIG. 11. For example, an N×N block of pixels, including the pixel of interest, may be set such that a number of pixels of the N×N block of pixels are increased by one gray level to account for the dithered bits when the bit-depth is reduced. As should be appreciated, the pixel of interest may be any pixel of the block of pixels 80. Furthermore, the block of pixels 80 may be of any suitable size (e.g., 2×2, 4×4, 8×8, 16×16, 32×32, 64×64, and so on) depending on implementation. For example, the size of the block of pixels 80 may depend on a pixel density (e.g., pixels per square inch) of the electronic display 12, an estimated distance from the electronic display 12 to a viewer's eye, the number of bits being dithered (e.g., bit-depth reduction), and/or additional parameters. As should be appreciated, while discussed herein as utilizing block sizes as multiples of two, other sized square blocks (e.g., 3×3, 5×5, 6×6, etc.) may also be utilized.

Of the block of pixels 80, base pixels 82 correspond to the image data values of the input image data 58 truncated at the reduced bit-depth (e.g., truncated image data) and do not receive an additional gray level due to the dithering of the pixel of interest. Conversely, dithered pixels 84 correspond to the image data values of the input image data 58 truncated at the reduced bit-depth (e.g., truncated image data) with a +1 gray level increase. As discussed above, the linearity sub-block 62 linearizes the changes in luminance accounted for by the dithering, accounting for the format of the input image data 58, by calculating the alpha ratio 76. The alpha ratio 76 corresponds to the ratio of dithered pixels 84 in the block of pixels 80. Furthermore, the linearity sub-block 62 may determine an alpha value equal to the number of dithered pixels 84 for the block of pixels 80 by multiplying the alpha ratio 76 by the number of pixels ($N^2$) in the block of pixels 80 and rounding to the nearest whole number. As should be appreciated, in some embodiments, the linearity sub-block 62 may calculate the alpha value directly from the input pixel value of the input image data 58 (e.g., in the non-linear color space 70) without calculating the alpha ratio.

Figure 12:
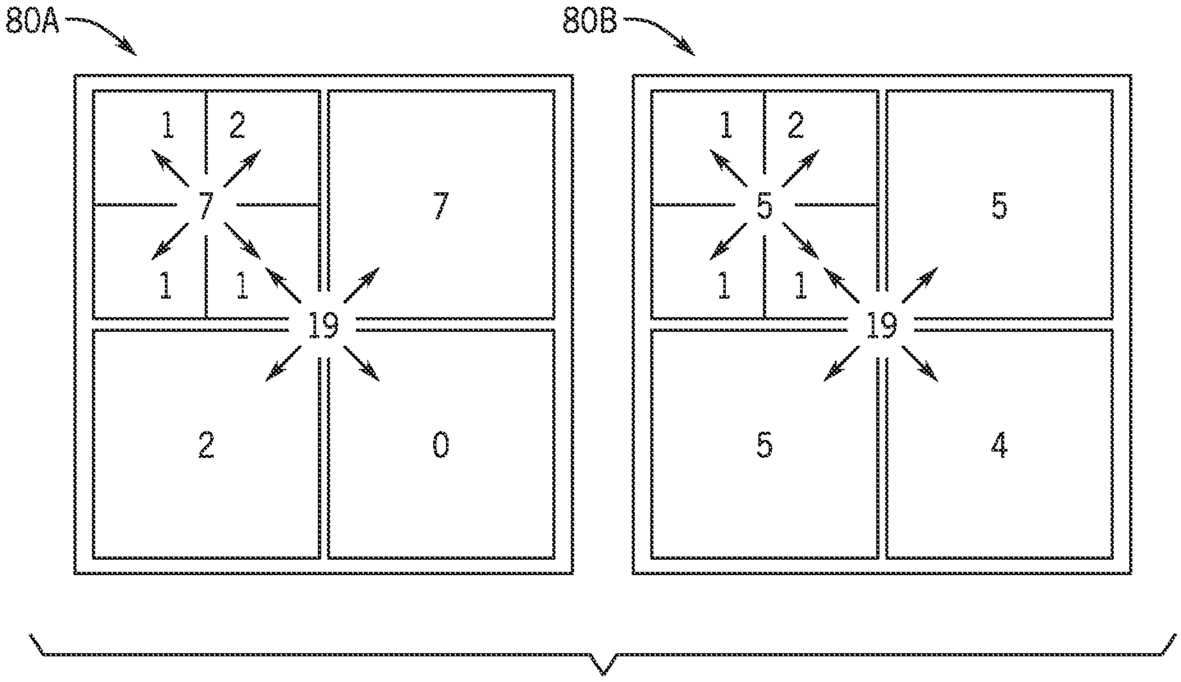
FIG. 12 is a depiction of an unevenly distributed dithered block of pixels and an evenly distributed dithered block of pixels, in accordance with an embodiment.

While accounting for the non-linearity of the non-linear color space 70 of the input image data 58 provides, in the aggregate, a reduced error 74 in the total luminance output, different distributions of the dithered pixels 84 may affect the perceived image quality. For example, FIG. 12 illustrates an unevenly distributed dithered block of pixels 80A and an evenly distributed dithered block of pixels 80B. While both dithered blocks of pixels 80A, 80B have 19 dithered pixels 84, the evenly distributed dithered block of pixels 80B may result in fewer image artifacts than the unevenly distributed dithered block of pixels 80A, as the human eye may more smoothly average the luminance outputs of pixels that are evenly spread out. In other words, the dither block 52 may distribute the dithered pixels 84 within the block of pixels 80 in a relatively even manner amongst the block of pixels 80 to help smooth optical averaging of the human eye and further reduce the likelihood of image artifacts (e.g., blockiness, banding) being introduced by the dithering process.

Additionally, in some embodiments, the multi-phase dither of the dither block 52 may include an aspect of randomness to the distribution to further obfuscate patterns, such as banding, or other image artifacts. In some embodiments, the dithered pixels 84 may be entirely randomly distributed amongst the block of pixels 80. Over time, such randomness will aggregate to a uniform distribution. However, an entirely random distribution is merely probabilistically evenly distributed for any one distribution. Indeed, a randomly generated distribution may generate an unevenly distributed dithered block of pixels 80A. In some embodiments, the dither block 52 utilizes a ranking system to guarantee an even distribution while maintaining an aspect of randomness.

For example, in some embodiments, to determine an evenly distributed and random assignment of the gray level increases, the multi-phase ranking sub-block 64 may assign a ranking to each pixel location of the block of pixels 80 based on multiple phase sets that are randomly generated. The dithering sub-block 66 may utilize the alpha value and the rankings of the pixel locations in the block of pixels 80 to apply the dither to the input image data 58.

Figure 13:
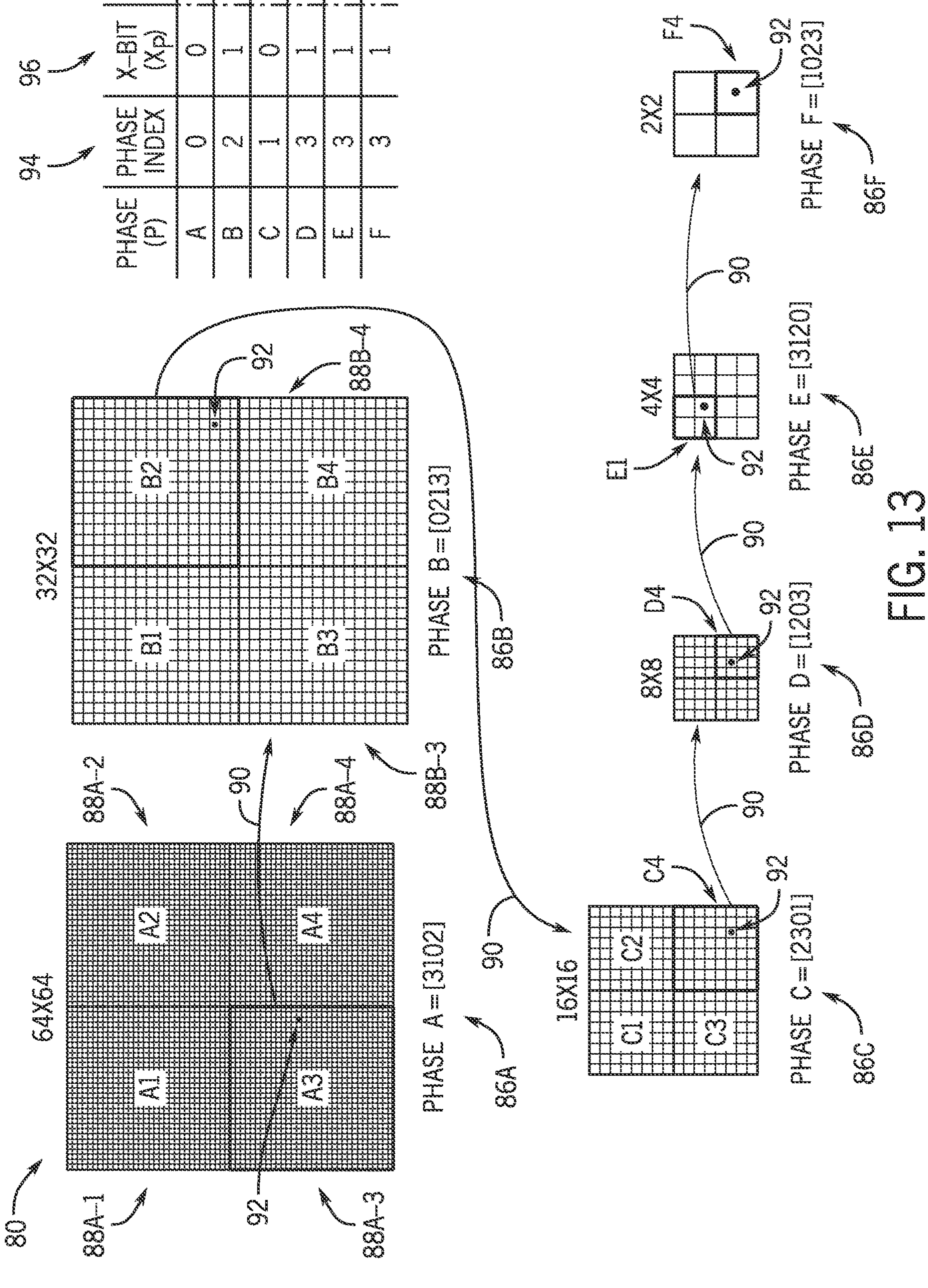
FIG. 13 is a 64×64 block of pixels decomposed with six phase sets, in accordance with an embodiment.

To generate the rankings, in some embodiments, the multi-phase ranking sub-block 64 may break down the block of pixels 80 into sub-blocks until a 1×1 sub-block is achieved, assigning a phase set at each decomposition. The phase sets may be a randomized ordering of numbers (e.g., {0,1,2,3}, {2,3,1,0}, {2,0,1,3}, etc.), such as via a random number generator (e.g., pseudo-random number generator, true random number generator), corresponding to the number of sub-blocks (e.g., four) in a decomposition, and a ranking may be calculated for each pixel of the block of pixels based on the phase sets. To help illustrate, FIG. 13 is a 64×64 block of pixels 80 decomposed with six phase sets 86 (e.g., phase sets 86A-86F, cumulatively, 86). In the depicted example, Phase A decomposes the 64×64 block of pixels into four 32×32 sub-blocks 88A (e.g., sub-blocks 88A-1-88A-4, cumulatively, 88A). Furthermore, each of the 32×32 sub-blocks 88A may be decomposed in Phase B into four 16×16 sub-blocks 88B (e.g., sub-blocks 88B-1-88B-4, cumulatively, 88B). For brevity, the decomposition 90 of the block of pixels 80 in FIG. 13 tracks a single example pixel location 92. Each pixel location (e.g., example pixel location 92) of the block of pixels 80 may include a unique set of phase indexes 94 based on the phase sets 86, which are used to calculate unique rankings for each pixel of the block of pixels. The phase indexes 94 for a pixel location are determined based on the relative position of the pixel location within the decomposed sub-blocks 88 of the phase, P, and the order of the phase set 86, which is randomly generated. For example, the example pixel location 92 is located in the third sub-block 88A-3 (e.g., as read in raster scan) for Phase A. Since the third component of the phase set 86A for Phase A is "0", the phase index 94 for Phase A for the example pixel location 92 is 0. Similarly, the example pixel location 92 is located in the second sub-block 88B-2 for Phase B. Since the second component of the phase set 86B for Phase B is "2", the phase index 94 for Phase B for the example pixel location 92 is 2. Continuing in this fashion, the phase indexes 94 for the example pixel location 92 are {0,2,1,3, 3,3}. Each phase index 94 is a two-bit integer that can be expressed as having an x-bit 96, $X_P$, and a y-bit 98, $Y_P$. In some embodiments, the individual bits (e.g., x-bit 96 and y-bit 98) of the phase indexes 94 may be used to determine an x-rank, $R_x$, and a y-rank, $R_y$, where $$R_x=32\cdot X_A+16\cdot X_B+8\cdot X_C+4\cdot X_D+2\cdot X_E+X_F;\text{ and } \quad EQ1$$

$$R_y=32\cdot Y_A+16\cdot Y_B+8\cdot Y_C+4\cdot Y_D+2\cdot Y_E+Y_F. \quad EQ2$$

As should be appreciated, the phase set values, block decomposition, and/or equation coefficients may vary based on implementation. Moreover, the above equations are given as examples for a 64×64 block of pixels 80 decomposed over six phases, and different size blocks of pixels 80 may be decomposed differently and/or use different numbers of phase. For example, an 8×8 block of pixels may be decomposed via three phases such that there are three phase indexes 94 and the x-rank and y-rank equations may include only the last three terms of EQ1 and EQ2, respectively. Additionally, in some embodiments, the phase sets 86 may be reorganized (e.g., rerandomized) for each pixel of interest, image frame, after a set number of frames or time, or based on another parameter, based on implementation. Such periodic rerandomization may give the multi-phase dither a temporal dither aspect along with the spatial dither aspect of the block of pixels 80.

In some embodiments, the rankings for the pixel locations are discrete and range from 0 to $N^2-1$. Moreover, the multi-phase ranking sub-block 64 may determine the rank, R, of each pixel location such that $$R=N\cdot R_y+R_x. \quad EQ3$$

In some embodiments, the dithering sub-block 66 may compare the rankings with the alpha value, and each pixel location of the block of pixels 80 with a ranking greater than or equal to the alpha value may receive a gray level increase. In other words, the dithering sub-block 66 may determine and apply dithering to one or more pixels of the block of pixels 80 (e.g., generating the dithered pixels 84) based on pixel locations of the block of pixels 80 having rankings greater than the alpha value.

Figure 14:
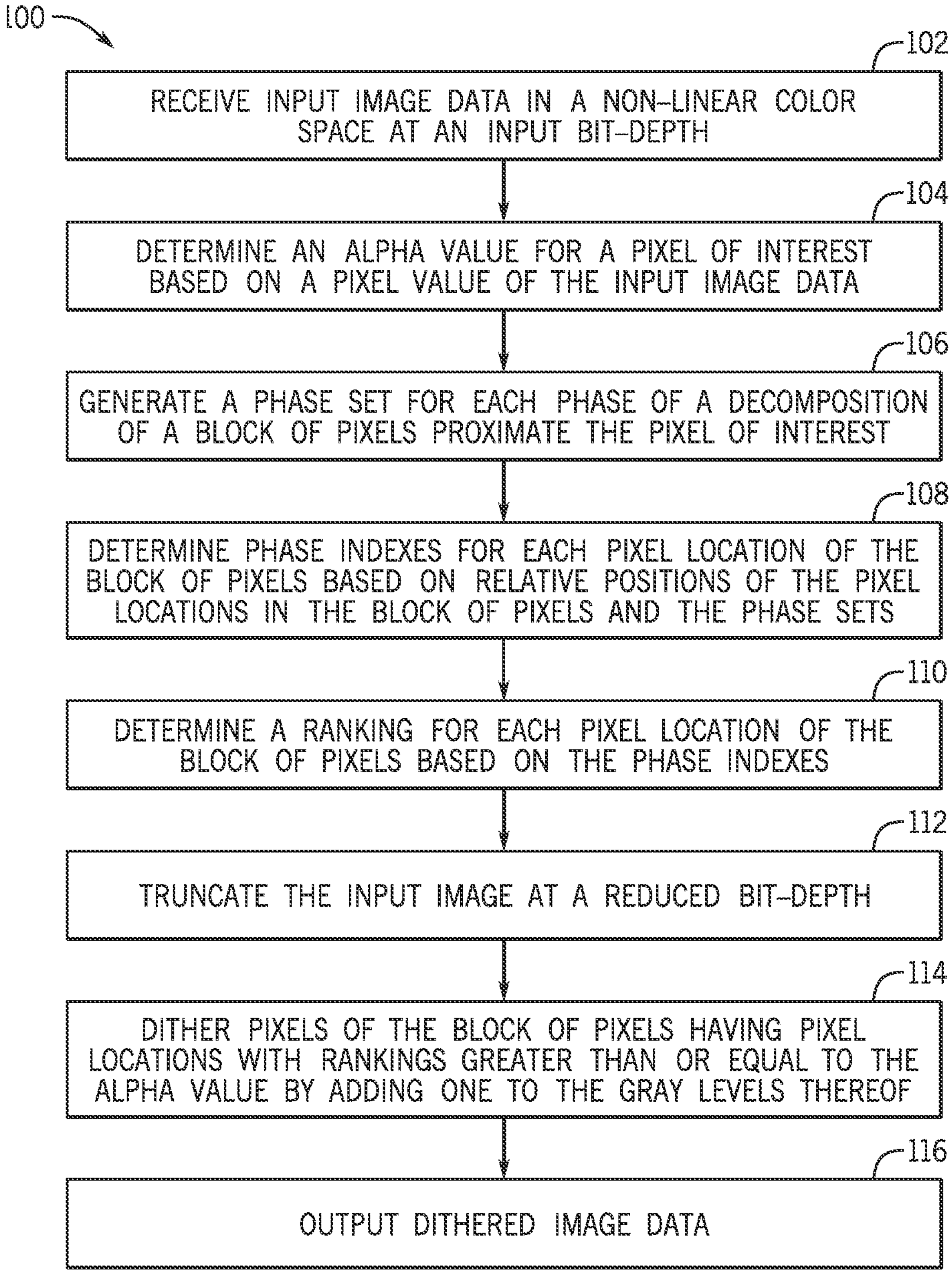
FIG. 14 is a flowchart of an example process for multi-phase dithering, in accordance with an embodiment.

FIG. 14 is a flowchart 100 of an example process for implementing a multi-phase dither, such as via the dither block 52. The dither block 52 may receive input image data 58 in a non-linear color space 70 at an input bit-depth (process block 102). Additionally, the dither block 52, such as via a linearity sub-block 62, may determine an alpha value for a pixel of interest based on a pixel value of the input image data 58 (process block 104). As should be appreciated, the alpha value may also be based on the number of bits being dithered (e.g., the difference between the input bit-depth and a reduced bit-depth of the dithered image data 60). Additionally, the dither block 52, such as via a multi-phase ranking sub-block 64, may generate a phase set 86 for each phase of a decomposition of a block of pixels 80 proximate the pixel of interest (process block 106). Furthermore, the dither block 52 may determine phase indexes 94 for each pixel location of the block of pixels based on the phase sets 86 and the relative positions of the pixel locations within the block of pixels 80 (process block 108), and a ranking may be determined for each pixel location of the block of pixels 80 based on the phase indexes 94 (process block 110). The input image data 58 may be truncated at a reduced bit-depth (process block 112). Moreover, the dither block 52, such as via a dithering sub-block 66, may dither pixels of the block of pixels 80 having pixel locations with rankings greater than or equal to the alpha value by increasing the gray levels thereof by one (process block 114) and output the dithered image data (process block 116).

With the foregoing in mind, the dither block 52 may provide a linear multi-phase dither to input image data 58 in a non-linear color space 70 while evenly and randomly distributing gray level increases to a block of pixels 80 for smoother and more efficient dithering with reduced error 74 and image artifacts.

The specific embodiments described above have been shown by way of example, and it should be understood that these embodiments may be susceptible to various modifications and alternative forms. Moreover, although the above referenced flowchart 100 is shown in a given order, in certain embodiments, process/decision blocks may be reordered, altered, deleted, and/or occur simultaneously. Additionally, the referenced flowchart 100 is given as an illustrative tool and further decision and process blocks may also be added depending on implementation. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display configured to display an image based on dithered image data; and image processing circuitry comprising:

a linearity sub-block configured to:

receive input image data in a non-linear color space at a first bit-depth;

truncate one or more least-significant-digits (LSBs) of the input image data, generating truncated image data at a second bit-depth less than the first bit-depth; and determine an alpha value indicative of how many pixel locations of a block of pixels to which an increase in gray level is to be applied based on an input pixel value of the input image data corresponding to a pixel of interest within the block of pixels, wherein the alpha value corresponds to a ratio of gray levels in a linear color space that equates to a luminance level of the input pixel value at the first bit-depth; and a dithering sub-block configured to:

apply the increase in the gray level to pixel values of the truncated image data corresponding to the pixel locations to generate the dithered image data at the second bit-depth;

wherein the image processing circuitry is configured to convert neither the input image data nor the truncated image data to the linear color space between receiving the input image data and applying the increase in the gray level to the pixel values of the truncated image data corresponding to the pixel locations.

2. The electronic device of claim 1, wherein the image processing circuitry is configured to determine an arrangement of the pixel locations within the block of pixels based on one or more phase sets, each phase set of the one or more phase sets comprising an ordered arrangement of indexing numbers.

3. The electronic device of claim 2, wherein the ordered arrangement is randomized based on a random number generator.

4. The electronic device of claim 2, wherein the image processing circuitry is configured to determine the arrangement of the pixel locations within the block of pixels based on respective rankings of the pixel locations, wherein the respective rankings are based on the one or more phase sets.

5. The electronic device of claim 4, wherein the respective rankings of the pixel locations to which the increase in gray level is to be applied are greater than or equal to the alpha value.

6. The electronic device of claim 4, wherein the image processing circuitry is configured to determine the respective rankings of the pixel locations based on respective unique sets of phase indexes that link the indexing numbers to sub-blocks of the block of pixels.

7. The electronic device of claim 6, wherein the image processing circuitry is configured to determine the respective rankings of the pixel locations based on bit-wise values of the phase indexes.

8. The electronic device of claim 4, wherein the respective rankings range from zero to $N^2-1$, where a size of the block of pixels is N×N.

9. The electronic device of claim 1, wherein the image processing circuitry is configured to determine the alpha value based on the input pixel value and a number corresponding to how many LSBs are truncated from the input image data.

10. The electronic device of claim 9, wherein the image processing circuitry is configured to determine the alpha value by:

determining the ratio based on the input pixel value and the number corresponding to how many LSBs are truncated from the input image data; and multiplying the ratio by a number of pixels in the block of pixels.

11. Image processing circuitry configured to:

receive input image data in a non-linear color space at a first bit-depth;

truncate one or more least-significant-digits (LSBs) of the input image data, generating truncated image data at a second bit-depth less than the first bit-depth;

determine an alpha value indicative of how many pixel locations of a block of pixels to which an increase in gray level is to be applied based on an input pixel value of the input image data corresponding to a pixel of interest within the block of pixels, wherein the alpha value is based on the input pixel value and a number corresponding to how many LSBs are truncated from the input image data;

determine an arrangement of the pixel locations within the block of pixels based on respective rankings of the pixel locations, wherein the respective rankings are based on one or more phase sets, each phase set of the one or more phase sets comprising an ordered arrangement of indexing numbers; and apply the increase in the gray level to pixel values of the truncated image data corresponding to the pixel locations to generate dithered image data at the second bit-depth.

12. The image processing circuitry of claim 11, wherein the alpha value corresponds to a ratio of gray levels in a linear color space that equates to a luminance level of the input pixel value at the first bit-depth.

13. The image processing circuitry of claim 11, wherein the ordered arrangement is randomized based on a random number generator.

14. The image processing circuitry of claim 13, wherein the ordered arrangement is rerandomized on each image frame of the input image data.

15. The image processing circuitry of claim 11, wherein the arrangement of the pixel locations to which the increase in gray level is to be applied is based on comparisons between the respective rankings and the alpha value.

16. The image processing circuitry of claim 11, wherein the image processing circuitry is configured to determine the respective rankings of the pixel locations based on respective unique sets of phase indexes that link the indexing numbers to sub-blocks of the block of pixels, and wherein the image processing circuitry is configured to determine the respective rankings of the pixel locations based on bit-wise values of the phase indexes.

17. A non-transitory, machine-readable medium comprising instructions, wherein, when executed by one or more processors, the instructions cause the one or more processors to perform operations or to control dither circuitry to perform the operations, wherein the operations comprise:

receiving input image data in a non-linear color space at a first bit-depth;

truncating one or more least-significant-digits (LSBs) of the input image data, generating truncated image data;

determining an alpha value indicative of how many pixel locations of a block of pixels to which an increase in gray level is to be applied based on an input pixel value of the input image data corresponding to a pixel of interest within the block of pixels, wherein the alpha value corresponds to a ratio of gray levels in a linear color space that equates to a luminance level of the input pixel value at the first bit-depth; and applying the increase in the gray level to pixel values of the truncated image data corresponding to the pixel locations to generate dithered image data at a second bit-depth, the second bit-depth is less than the first bit-depth by the one or more LSBs, wherein neither the input image data nor the truncated image data is converted to the linear color space between receiving the input image data and applying the increase in the gray level to the pixel values of the truncated image data corresponding to the pixel locations.

18. The non-transitory, machine-readable medium of claim 17, wherein the operations comprise determining an arrangement of the pixel locations within the block of pixels based on respective rankings of the pixel locations, wherein the respective rankings are based on one or more phase sets, each phase set of the one or more phase sets comprising an ordered arrangement of indexing numbers.

19. The non-transitory, machine-readable medium of claim 17, wherein the alpha value is based on the input pixel value and a number corresponding to how many LSBs are truncated from the input image data.

20. Image processing circuitry comprising:

linearity circuitry configured to:

receive input image data in a non-linear color space at a first bit-depth;

truncate one or more least-significant-digits (LSBs) of the input image data, generating truncated image data at a second bit-depth less than the first bit-depth; and determine an alpha value indicative of how many pixel locations of a block of pixels to which an increase in gray level is to be applied based on an input pixel value of the input image data corresponding to a pixel of interest within the block of pixels;

multi-phase ranking circuitry configured to determine an arrangement of the pixel locations within the block of pixels based on comparisons between respective rankings of the pixel locations and the alpha value, wherein the respective rankings are based on one or more phase sets, each phase set of the one or more phase sets comprising an ordered arrangement of indexing numbers; and dithering circuitry configured to apply the increase in the gray level to pixel values of the truncated image data corresponding to the pixel locations to generate dithered image data at the second bit-depth.

21. The image processing circuitry of claim 20, wherein neither the input image data nor the truncated image data is converted to a linear color space between receiving the input image data and applying the increase in the gray level to the pixel values of the truncated image data corresponding to the pixel locations.

* * * * *